United States Patent
Carbune et al.

(10) Patent No.: US 11,178,093 B2
(45) Date of Patent: Nov. 16, 2021

(54) INTER-OPERATIVE MESSAGE NOTIFICATION AGENT

(71) Applicant: GOOGLE LLC, Mountain View, CA (US)

(72) Inventors: Victor Carbune, Winterthur (CH); Thomas Deselaers, Zürich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/553,357

(22) Filed: Aug. 28, 2019

(65) Prior Publication Data

US 2020/0329004 A1    Oct. 15, 2020

Related U.S. Application Data

(60) Provisional application No. 62/833,068, filed on Apr. 12, 2019.

(51) Int. Cl.
| | | |
|---|---|---|
| H04L 12/00 | (2006.01) | |
| H04L 12/58 | (2006.01) | |
| G06F 16/245 | (2019.01) | |
| H04L 29/08 | (2006.01) | |

(52) U.S. Cl.
CPC ............ H04L 51/24 (2013.01); G06F 16/245 (2019.01); H04L 67/22 (2013.01)

(58) Field of Classification Search
CPC ..... H04L 51/16; H04L 67/201; H04L 51/066; H04L 5/0094; H04L 65/1096; H04L 51/24; G05B 23/027; G07F 17/332
USPC ................................................. 709/206, 207
See application file for complete search history.

(56) References Cited

U.S. PATENT DOCUMENTS

| | | | | |
|---|---|---|---|---|
| 6,937,950 B2* | 8/2005 | Cragun | ................ | G06Q 10/109 345/473 |
| 7,523,397 B2* | 4/2009 | Cheung | ................... | G06F 9/542 715/710 |
| 7,739,345 B2* | 6/2010 | Heinzel | ................ | G06Q 10/107 709/207 |
| 7,809,794 B2* | 10/2010 | Fellenstein | ............. | H04L 51/24 709/205 |
| 8,224,917 B1* | 7/2012 | Denise | .................... | H04L 51/24 709/206 |
| 8,255,472 B2* | 8/2012 | MacBeth | ................ | H04L 51/34 709/206 |
| 8,275,402 B2* | 9/2012 | Talty | ................... | H04L 12/1895 455/518 |

(Continued)

OTHER PUBLICATIONS

Extended European search report for Application No. 19198918.5 dated Oct. 28, 2019, 7 pages.

*Primary Examiner* — Frantz Coby
(74) *Attorney, Agent, or Firm* — Lowenstein Sandler LLP

(57) ABSTRACT

The disclosure provides technology for adaptively creating and adjusting reminder notifications for a first user based on activity of a second user. An example method includes identifying an electronic message transmitted between a first user device and a second user device; accessing data associated with a user of the second device, wherein the data comprises activity state data for the user; determining a notification time for the first device based on the data associated with the user of the second device; and updating a reminder related to the electronic message based on the notification time.

20 Claims, 4 Drawing Sheets

(56) References Cited

U.S. PATENT DOCUMENTS

| | | | | |
|---|---|---|---|---|
| 8,660,790 | B2* | 2/2014 | Stahl | G04B 19/24 |
| | | | | 701/465 |
| 8,745,141 | B2* | 6/2014 | Rosenberg | G06Q 10/109 |
| | | | | 709/206 |
| 9,015,256 | B1* | 4/2015 | Zimmers | G08B 27/006 |
| | | | | 709/206 |
| 9,368,021 | B2* | 6/2016 | Touloumtzis | G06Q 10/109 |
| 9,439,038 | B2* | 9/2016 | Chowdhury | H04W 4/02 |
| 9,515,977 | B2* | 12/2016 | Appelman | G06Q 30/02 |
| 9,854,084 | B2* | 12/2017 | Chang | H04M 1/72522 |
| 9,990,610 | B2* | 6/2018 | Agarwal | G06F 40/169 |
| 10,063,999 | B2* | 8/2018 | Cherry | H04W 4/12 |
| 10,147,266 | B2* | 12/2018 | Joao | G07F 17/32 |
| 2008/0189159 | A1* | 8/2008 | Jain | G06Q 10/1093 |
| | | | | 705/7.18 |
| 2009/0106365 | A1 | 4/2009 | Droy et al. | |
| 2013/0290435 | A1* | 10/2013 | Martin | H04L 51/28 |
| | | | | 709/206 |
| 2013/0316744 | A1* | 11/2013 | Newham | H04M 1/663 |
| | | | | 455/458 |
| 2014/0173009 | A1 | 5/2014 | Denis | |
| 2014/0280727 | A1* | 9/2014 | Richards | H04L 67/20 |
| | | | | 709/217 |
| 2015/0350148 | A1 | 12/2015 | Kenney et al. | |
| 2016/0294752 | A1* | 10/2016 | Wu | H04L 51/16 |
| 2016/0316414 | A1* | 10/2016 | Yeoum | H04L 65/1096 |
| 2018/0300983 | A1* | 10/2018 | Joao | G07F 17/3223 |
| 2019/0007180 | A1* | 1/2019 | Shi | H04L 5/0094 |
| 2019/0253368 | A1* | 8/2019 | Kim | H04L 51/066 |
| 2020/0117179 | A1* | 4/2020 | Lutz | G05B 23/027 |

* cited by examiner

INTER-OPERATIVE MESSAGE NOTIFICATION AGENT

RELATED APPLICATIONS

This application claims the benefit of U.S. Provisional Patent Application No. 62/833,068 filed Apr. 12, 2019, entitled "Inter-Operative Message Notification Agent," which is incorporated by reference herein.

TECHNICAL FIELD

This disclosure relates to the field of message sharing platforms and, in particular, to adaptively adjusting message notifications based on user activity.

BACKGROUND

Modern computers enable users to communicate with one another using a variety of different electronic messaging techniques. The electronic messaging techniques may enable a user to transmit a message to another user. The other user is often busy or unavailable when receiving the message and may intentionally or unintentionally fail to respond to the message. Some users may manually schedule alerts for a message they send or receive to avoid a failure to respond. For example, the sending user may schedule an alert to send a follow-up message to the recipient and the recipient may schedule an alert to respond to the message. The alerts may be scheduled for a particular time and may notify the respective user to perform an action.

SUMMARY

The following is a simplified summary of the disclosure in order to provide a basic understanding of some aspects of the disclosure. This summary is not an extensive overview of the disclosure. It is intended to neither identify key or critical elements of the disclosure nor delineate any scope of the particular embodiments of the disclosure or any scope of the claims. Its sole purpose is to present some concepts of the disclosure in a simplified form as a prelude to the more detailed description that is presented later.

In a first aspect of the present disclosure, there is provided a method that comprises: identifying, by a processing device, an electronic message transmitted between a first user device and a second user device; accessing data associated with a user of the second device, wherein the data comprises activity state data for the user; determining a notification time for the first device based on the data associated with the user of the second device; and updating a reminder related to the electronic message based on the notification time.

In another aspect, the electronic message comprises an email message, an instant message, a text message, a voice message, or a video message. The electronic message may be sent by the first user device and the reminder may correspond to a follow-up message for the electronic message or the electronic message may be received by the first user device and the reminder may correspond to a response message for the electronic message. In one example, the processing device may comprise a processing device of the first user device and accessing data associated with the user may comprise querying the second user device. In another example, the processing device may comprise a processing device of a server and accessing the data associated with the user comprises querying user data from the server.

In yet another aspect, the method may involve detecting, based on the activity state data for the user that a reminder alert for the electronic message was presented on the second device within a predefined time period. The activity state data associated with a user of the second device may comprise at least one of routine data, workload data, or alert data. The processing device may then delay the reminder on the first device based on the notification time.

In a second aspect of the present disclosure, there is provided a system comprising: a memory; and a processing device communicably coupled to the memory, the processing device configured to carry out the method according to the first aspect.

In a third aspect of the present disclosure, there is provided a non-transitory computer-readable storage medium comprising instructions to cause a processing device to carry out the method according to the first aspect.

BRIEF DESCRIPTION OF THE DRAWINGS

The present disclosure is illustrated by way of example, and not by way of limitation, in the figures of the accompanying drawings.

Figure 1:
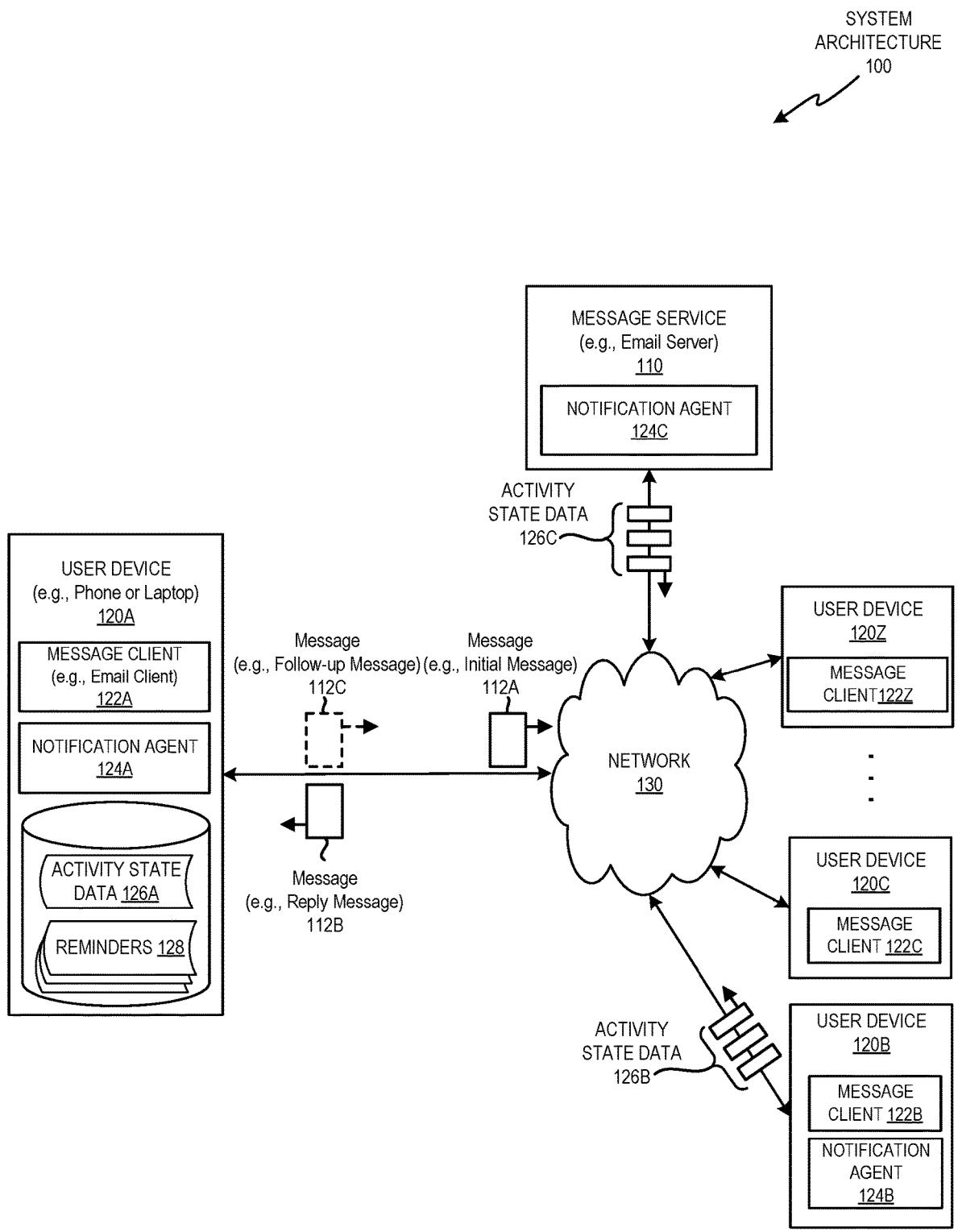
FIG. 1 illustrates an example system architecture that includes a messaging service that includes adaptive notification features, in accordance with an implementation of the disclosure.

These drawings may be better understood when observed in connection with the following detailed description.

DETAILED DESCRIPTION

Modern messaging systems enable a computer to create automatic alerts based on messages that have been sent or received. The computer may determine that a message was sent but no reply was received or that a message was received and no reply was sent. The mechanism for automatic alerts often uses a predetermined duration of time and may use that duration of time for creating alerts for both the sender and recipient of the same message. As such, the sender and recipient may both receive an alert a few hours or days after the message was sent. The sender may prepare and send a follow-up message and the recipient may prepare and send a response and the two messages may cross in transit. In this instance, computing resources are wasted to process the follow-up alert and the follow-up message because neither added value, since the response would have been received in their absence. The wasted resources often occur because existing mechanisms for automatic alerts focus on the state of the user being alerted as opposed to the state of the other user.

Aspects and implementations of the present disclosure are directed to technology for creating and adjusting reminders for messages transmitted between user devices. The messages may include email messages, text messages, audio messages, picture messages, video messages, other electronic communication, or a combination thereof. The technology can add, remove, or update reminders for a user of a first user device based on data associated with a user of a second user device. The user of the second user device may be a recipient of the initial message or may be the user that sent the initial message. The data associated with the user of the second user device may indicate an activity state of the second user device and may indicate alerts, routines, or workloads affecting the second user device or the user of the second user device.

In one example, the technology may involve identifying an electronic message transmitted between a first user device and a second user device and accessing data associated with a user of the second user device. The data may include activity state data for the user and/or second user device. The technology may determine a notification time for a reminder of the first user device based on the data associated with the user of the second user device. The notification time may be a time at which a reminder is to be provided to the user. The technology may update a reminder related to the electronic message based on the reminder notification time. The update may create, remove, or delay the reminder to avoid an unnecessarily notification to the user of the first user device.

Systems and methods described herein include technology that enhances the technical field of message sharing platforms, by addressing technical problems associated with unnecessary reminder notifications and unnecessary transition of electronic messages. In particular, the technology disclosed may reduce spurious reminder notifications. A spurious reminder notification may be a notification that is processed by a user device and presented to the first user but does not advance a goal corresponding to the message. The goal may be to have the first user or the second user fulfill a task corresponding to the message. The technology may also reduce the amount of electronic messages being exchanged between the user devices. For example, if the reminder notification were delayed or removed because a reply was being prepared it would reduce the creation and transition of a follow up electronic message. The reduction in the quantity of electronic messages may reduce the consumption of network bandwidth, processing power, and/or storage resources of one or more computing devices associated with the message sharing platform. That is, the disclosed subject matter provides a more computationally efficient message sharing platform, where data from one user device is used to provide more efficient processing at another user device.

Various aspects of the above referenced methods and systems are described in detail herein below by way of examples, rather than by way of limitation. Some of the examples provided below discuss email messages transmitted between user devices. In other examples, the messages may be any communication that includes textual data, audio data, picture data, video data, other data, or a combination thereof.

FIG. 1 illustrates an example system architecture 100 for creating and adjusting notifications for electronic messages, in accordance with an implementation of the disclosure. The system architecture 100 may include one or more message services 110, messages 112A-C, user devices 120A-Z, a network 130, other elements, or a combination thereof. In other examples, more or less elements may be present.

Message service 110 may include one or more computing services that enable the transmission of messages between user devices. Message service 110 may be an email service, a text message service, an instant message service, a video chat service, a voice over IP service, other service, or a combination of any of the above services. Message service 110 may be a part of a message sharing platform and may include one or more computing devices (such as rackmount servers, a server computer, a personal computer, a mainframe computer, a laptop computer, a tablet computer, a desktop computer, a router, etc.), data stores (e.g., hard disks, memories, databases), networks, software components, and/or hardware components. Message service 110 may enable one or more users or user devices to initiate the transmission or receipt of messages 112A-C.

Messages 112A-C may include any electronic message that can be transmitted between computing devices to communicate information between multiple users. Messages 112A-C may be stored and organized in one or more data structures and may include or be associated with data that indicates one or more recipients, senders, or a combination thereof. The recipient and sender may be a user device, a user account, an individual user, or a combination thereof. Messages 112A-C may also or alternatively include content data or link to content data. The content data may include textual data, audio data, video data, image data, other data, or a combination thereof. One or more of the messages 112A-C may provide information (e.g., informational message) and/or invoke an action (e.g., action request message). The action may involve performing a task that may or may not include the transmission of one or more subsequent electronic messages (e.g., responses). In one example, the electronic messages may be email messages, text messages, audio messages, video messages, picture messages, other messages, or a combination thereof.

Messages 112A-C may correspond to initial messages, follow up messages, reply messages, other messages, or a combination thereof. Message 112A may be a message that is initiated by user device 120A and transmitted via message service 110 to one or more user devices 120B-Z. Message 112A may be referred to as an initial message and may include content (e.g., a request) that may invoke one or more responses from recipients of the message. Message 112B may be a response message that is initiated by user device 120B and transmitted via message service 110 back to user device 120A. Message 112B may include a response to initial message 112A and may be referred to as a reply message. The reply message may include content that fulfills a prior request, includes one or more additional requests, or a combination thereof. Reply message may also or alternatively include content that acknowledges the delivery (e.g., delivery receipt), consumption (e.g., read receipt), or other operation related to a prior message (e.g., initial message). Message 112C may be a follow up message that is transmitted by the same user device or a different user device and may follow up on a previously sent message (e.g., message 112A of user device 120A). The follow up message may be sent before, during, or after the transmission of the reply message.

In the example shown in FIG. 1, messages 112A-C are based on an initial message that was sent by user device 120A. In an alternate example (not shown), the initial message may be received by user device 120A and may have been sent by one of the other user devices (e.g., 120B-Z). In the latter situation, each of the arrows associated with messages 112A-C may be flipped and the initial message and follow up message may point to user device 120A and the reply message may point toward one of the other user devices 120B-Z.

User devices 120A-Z may include any computing device that can enable a user to access, send, or transmit a message. User devices 120A-Z may include mobile phones (e.g., smart phones), tablet computers, laptops, netbook computers, personal computers (PCs), set top boxes, smart watches, smart speakers, infotainment systems, other device, or a combination thereof. User devices 120A-Z may also be referred to as "client devices" and may be configured to receive user input from one or more end users. The term "first user device" and "second user device" may refer generally to user devices involved in a message exchange and the term "first" and "second" may or may not indicate which user device transmitted the initial message. For example, the first user device may transmit the initial message to the second user device or the second user device may transmit the initial message to the first user device. The term "complementary user device" or "complementary user" may generally refer to the other entity involved in a message exchange (e.g., device or user) and may be agnostic as to whether the other entity sent or received the message. Each of user devices 120A-Z may support one or more message clients 122A-Z.

Message clients 122A-Z may be a program or part of a program that may be executed by the user device or message service and enable a user to send, receive, or view messages. Message clients 122A-Z may be applications that are installed on the user device (e.g., installed application) or are packaged with the user device (e.g., native application). One or more of message clients 122A-Z may be downloaded to or embedded within another program such as a web browser. Each of the message clients 122A-Z may be capable of presenting content of a message, which may involve displaying or playing image content, audio content, or a combination thereof.

Notification agents 124A-C may access message data and determine whether to schedule one or more reminders for user devices 120A-Z. Notification agents 124A-C may schedule the reminders with or without providing logic to present reminder notifications to the users. Notification agents 124A-C may run on a user device (e.g., 120A, 120B), on a server device (110), other device, or a combination thereof. Notification agents 124A-Z may execute as a standalone program or embedded within one or more message clients 122A-C, message service 110, or a combination hereof. In one example, notification agent features may execute on the user device that sent a message and may or may not execute on the user device that receives the message (or vice versa). In another example, the notification agent features may execute on a server as part of message service 110 and be absent from one or more of the user devices 120A-Z (e.g., absent from some or all user devices). In either example, notification agents 124A-C can be used to create or update reminders 128.

Reminders 128 may be represented by data structures that coordinate notifications on user devices 120A-C. Each of the messages 112A-C may correspond to one or more of the reminders 128. Reminders 128 may each be integrated into its corresponding message data structure or may be stored in a separate data structure that is associated with the corresponding message data structure. A reminder may be associated with the message when the reminder contains a link (e.g., pointer) to the message or contains data to enable a device or user to identify the corresponding message. The data to identify the message may include textual data referencing the recipient, sender, message subject, project, task, due date, receipt date, other information, or a combination thereof. The data may also or alternatively include binary or non-binary data that includes a link, pointer, or other data structure that can be used to uniquely identify a message (e.g., message identifier), user device (e.g., user device identifier, computer name), user identifier (e.g., account name or ID), other data, or a combination thereof. Reminders 128 may be created, removed, or updated by notification agents 124A-C based on activity state data 126A-C.

Activity state data 126A-C may include data that indicates activity of a user, a user device, a message service, or a combination thereof. Activity state data 126A-C may include notification data, user workload data, routine data, which are discussed in more detail in regards to FIG. 2. In one example, activity state data 126A may be associated with activity corresponding to user device 120A (e.g., first user device) and activity state data 126B may be associated with activity corresponding to user device 120B (e.g., second user device). Activity state data 126C illustrates an example where activity state data is received from a server of the message service 110 as opposed to one of the user devices. Activity state data 126C may be associated with activity corresponding to user device 120A, user device 120B, or a combination thereof. In general, activity state data may be analyzed locally (e.g., by user device 120A or message service 110) or may be transmitted to another computing device for analysis.

In situations in which the systems discussed herein attempt to collect personal information about user devices or users, or may make use of personal information, the users may be provided with an opportunity to control whether the message sharing platform can collect or use the data. The data may be associated with one or more user devices 120A-Z, messages 112A-C, reminders 128, activity state data 128A-C (e.g., out of office message, calendar status, notification data, user workload data, routine data), other user information (e.g., information about a user's social network, social actions or activities, profession, a user's preferences, or a user's current location). The users may control whether and/or how the message service and/or message clients access, receive, or transmit the data to other message clients or services. In addition, certain data may be treated in one or more ways before it is stored or used, so that personally identifiable information is removed. For example, the data discussed above may be treated so that no personally identifiable information can be determined for the user, or a user's geographic location may be generalized where location information is obtained (such as to a city, ZIP code, or state level), so that a particular location of a user cannot be determined. Thus, the user may have control over how data is collected and used by the message sharing platform.

Network 130 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Figure 2:
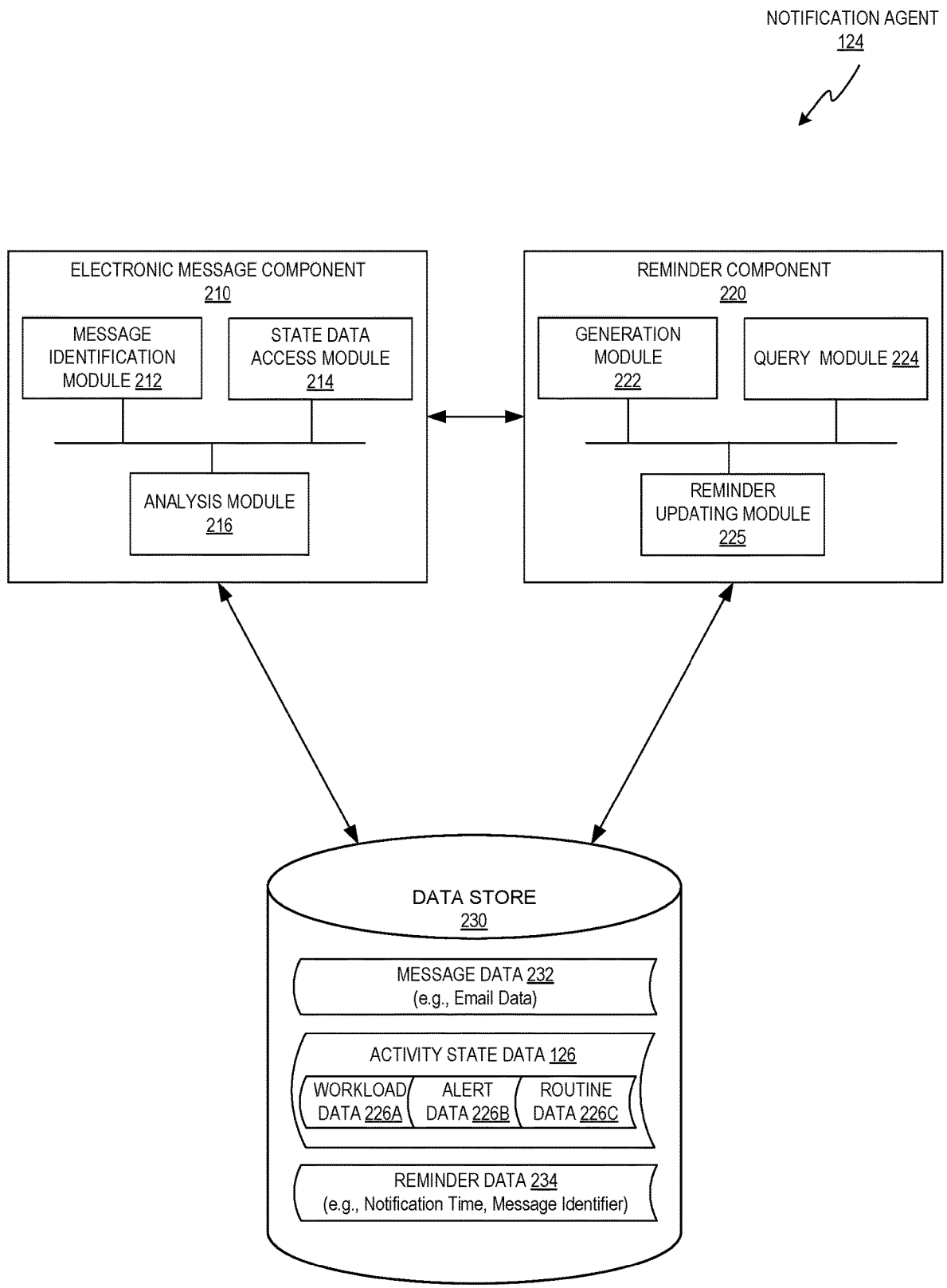
FIG. 2 is a block diagram illustrating example components and modules of a notification agent in accordance with an implementation of the disclosure.

FIG. 2 depicts a block diagram illustrating an exemplary notification agent 124 that includes technology for scheduling and adjusting reminder notifications for a first user based on activity state data of a second user, in accordance with one or more aspects of the present disclosure. Notification agent 124 may be executed by a user device, a server device, or a combination thereof. The computing device executing notification agent 124 may be referred to as a notification user device (e.g., primary device) and the other devices may be referred to as auxiliary devices.

Notification agent 124 may be the same or similar to one or more of the notification agents 124A-C of FIG. 1 and may include an electronic message component 210 and a reminder component 220. More or less components or modules may be included without loss of generality. For example, two or more of the components may be combined into a single component, or features of a component may be divided into two or more components. In one implementation, one or more of the components may reside on different computing devices (e.g., a client device and a server device).

Electronic message component 210 may enable notification agent 124 to access message data for one or more messages. In one example, electronic message component 210 may include a message identification module 212, a state data access module 214, and an analysis module 216.

Message identification module 212 may enable notification agent 124 to access electronic messages of one or more user devices. The electronic messages may have been transmitted between a first user device and a second user device or may be in the process of being prepared and not yet transmitted. The electronic messages may be email messages, instant messages, text messages, voice messages, video messages, other messages, or a combination thereof. The electronic messages may include sent messages, received messages, draft messages, deleted messages, saved messages, other messages, or a combination thereof.

Message identification module 212 may analyze the electronic messages and create and store message data 232 in data store 230. Message data 232 may include data of the electronic messages or data derived from the electronic messages. Exemplary message data 232 may include sender data (e.g., sending account), recipient data (e.g., receiving accounts), message count data (e.g., count of unread mail), read receipt data, other data, or a combination thereof. In one example, message identification module 212 may communicate with a message client or message service to access electronic messages that were sent or received by a particular user account. Message identification module 212 may then generate message data 232 that represents one or more recipients, senders, content, or times associated with the accessed electronic messages. Message identification module 212 may then use message data 232 to select one or more electronic messages for further analysis.

State data access module 214 may enable notification agent 124 to generate and provide access to activity state data 126. Activity state data 126 may be the same or similar to activity state data 126A-C of FIG. 1 and may indicate the activity of a user or user device associated with the one or more selected electronic messages. As discussed above, notification agent 124 may execute on a first device (e.g., primary device, notifying device) and activity state data 126 may indicate the activity of a second user device (e.g., auxiliary device, other device). Therefore, the activity may be of a user or device that is different from the user or device associated with the reminder notification. Activity state data 126 may be generated by notification agent 124 in response to data received from the other device or may be created by the other device and then sent to notification agent 124. In either example, notification agent 124 may store activity state data 126 in data store 230. The stored activity state data 126 may correspond to one or more individual actions, aggregate actions, or a combination thereof and may include a mean, median, mode, other statistical measurement, or combination thereof.

Examples of activity state data 126 may include workload data 226A, alert data 226B, routine data 226C, other data, or a combination thereof. Data 226A-C may be received from or derived from one or more message services, calendar services, task services, other source, or a combination thereof. Workload data 226A may indicate details related to calendar entries (e.g., out of office, meetings, vacations), task entries (e.g., assignment queue), message entries (e.g., quantity of unread or unresponded messages), other entry, or a combination thereof. Alert data 226B may indicate alerts that have been provided on a user device to the other user or will be provided on the user device to the other user. The alerts may be the same or similar to reminder notifications and may be presented by the auxiliary device as opposed to the primary device executing notification agent 124. Alert data 226B may indicate past alerts, current alerts, future alerts, other alerts, or a combination thereof. Alert data 226B may also indicate user or device actions corresponding to the alert, such as, an action done to dismiss, reschedule, move, snooze, complete, categorize, or adjust due dates, urgency, or other aspect. Alert data 226 may also indicate user actions that are associated with fulfilling a task or requesting additional information for a task corresponding to the alert.

Routine data 226C may indicate patterns of activity of the user or user device. The patterns of activity may relate to when messages are accessed, read, followed-up, responded to, other action, or a combination thereof. In one example, routine data 226 may correspond to a recipient of a message and indicate an average duration of time before transmitting a reply message. In another example, routine data 226 may correspond to a sender of a message and indicate an average duration of time before sending a follow up message. In either example, the routine data 226C may take into account time data associated with the message and may provide a routine that is particular to a time of day (e.g., before, during, or after work day), day of the week (e.g., weekend, weekday), day of the year (holiday, end of quarter), other times, or a combination thereof. For example, how quickly a user responds to messages received during working hours versus received at night on a weekend. Routine data 226C may also include data indicating a relationship between the users, such as, a business relationship (buyer, seller), work relationship (e.g., boss, peer), personal relationship (friend, spouse, parent, child), other relationship, or a combination thereof. For example, a user may generally respond more quickly to a boss then an acquaintance.

In one example, activity state data 126 may indicate an expectation of the user of the auxiliary user device and the notification agent 124 may generate a reminder for a first user based on the expectation of a second user of the auxiliary device. As discussed above, the auxiliary device may be associated with the sender (e.g., task requestor) or the recipient (e.g., task requestee). The expectation of the sender may correspond to when the sender may expect a reply or how long the sender typically waits before sending a follow up message. Using activity state data 126 to determine an expectation of the other user may be particularly advantageous when the sender and recipient have not previously interacted or rarely interact with one another. For example, a user may be a new employee and may have received messages from multiple other employees. Notification agent 124 may be able to approximate expectations of the other employees and provide reminders that enhance the ability of the new employee to fulfill the employees' expectations. This may reduce or avoid the overhead of messaging the other employees to determine when they expect a reply and may reduce stress on the new employee.

State data access module 214 may access the activity state data corresponding to one or more other devices using a variety of techniques. Accessing the data may involve analyzing data embedded in an electronic message that was previously sent or received. Accessing the data may also or alternatively involve accessing data locally in data store 230 or remotely over a network from another device. Accessing the data remotely may involve querying one or more of the other devices in the system architecture, such as, another user device (e.g., auxiliary device) or a server device of the message service. In one example, notification agent 124 may execute on the primary user device and may transmit one or more requests (e.g., queries) to another device to obtain data about the other user (e.g., a recipient or sender). In another example, notification agent 124 may execute on a server of the message service and accessing the data may involve querying data of the other user from a storage device of the server without going over the internet.

Analysis module 216 may analyze the data discussed above or below to determine whether a reminder should be generated for an electronic message and may propose a notification time for the reminder. As discussed below, the notification time of the reminder may be selected or adjusted before, during, or after the reminder is generated using the same or similar technique. Analysis module 216 may use a rule set, a probabilistic model, or a combination thereof to make its determinations.

Analysis module 216 may implement a feedback mechanism to enhance the determinations made by analysis module 216. The feedback mechanism may incorporate techniques for supervised machine learning, unsupervised machine learning, or a combination thereof. The machine learning techniques may access training data that indicate past reminder notifications, user actions, and activity state data. The training data may be based on actions of the current user of the primary device or may be actions of the other user of the auxiliary device. In one example, the training data may indicate activity state data and corresponding reminder notifications and whether the user presented with the notification rescheduled the notification or acted on the notification by transmitting a follow up message that resulted in a reply message. Analysis module 216 may analyze the training data to discover patterns and generate or update a probabilistic model to reflect the patterns (e.g., train a machine learning model). Analysis module 216 may then apply the probabilistic model in view of a current situation to approximate a notification time for a reminder.

In one example, the machine learning may involve an unsupervised machine learning technique that is the same or similar to a multi-armed bandit optimization or a contextual bandit optimization. Multi-armed bandit optimization may be a pseudo-reinforced machine learning optimization and the contextual bandit optimization may be simplified version of reinforcement learning that is an extension of the multi-armed bandit optimization. The multi-armed bandit optimization may enable notification agent 124 to tradeoff between acquiring new knowledge (called "exploration") or further optimizing based on existing knowledge (called "exploitation"). There may be an inherent tradeoff between exploration and exploitation such that exploration attempts to identify a new solution and exploitation further optimizes a known solution. Analysis module 216 may select between exploration or exploitation based on one or more context vectors (e.g., a d-dimensional feature vectors) associated with a current iteration, past iteration, or a combination thereof. Notification agent 124 may use context vectors along with the rewards of past selections to make a selection for current or future iterations. Over multiple iterations, the optimization may collect enough information about how the context vectors and rewards relate to each other to make a determination in regards to a reminder (e.g., creation or time adjustment of a reminder).

In one example, a goal of the feedback mechanism may be to recommend actions (e.g., reminder creation or time adjustments) that maximize a cumulative reward for one or more of the users. For example, user A sends an electronic message to user B and has not received a response yet. Notification agent 124 for user A may analyze the effects of presenting a notification to user A and instead of presenting the notification the notification agent 124 may communicate with the message client of user B to indicate to the message client that it intends to present a notification to user A and to ask whether user B has been recently shown a notification. The message client for user B may then respond with an indication of whether or not there is a scheduled notification for user B and when it was or will be presented to user B (e.g., presented yesterday and user B has not responded). In this situation, notification agent 124 may provide a notification to user A and suggest sending a follow up message. Alternatively, the message client of user B may indicate that there was no notification yet because there were too many notifications provided to user B yesterday and that a notification will be provided later today. In this case, notification agent 124 may adjust the notification time to delay the reminder (e.g., move to tomorrow). In one example, notification agent 124 may use the information received from the message client of user B to provide a status message in regards to the other user. The status message may provide information about user B without suggesting or recommending an action be performed by user A (e.g., "you haven't gotten an answer yet but user B has an alert scheduled for later today—will remind you again tomorrow unless you receive a response message").

Reminder component 220 may enable notification agent 124 to generate and update reminders that are associated with the electronic messages analyzed by electronic message component 210. In one example, reminder component 220 may include a generation module 222, a query module 224, and a reminder updating module 225.

Generation module 222 may enable notification agent 124 to create one or more reminders. As discussed above, a reminder may be a data structure that is associated with one or more electronic messages. The reminder data structure may be associated with a particular user (e.g., user account) and may cause notifications (e.g., alerts) to occur on one or more devices associated with the user. The reminder data structure may be created by a client device or server device and may be stored on the client device, server device, or a combination thereof. For example, the client device may create the reminder data structure and store it on a server where it may be synchronized to one or more devices associated with the user (e.g., a user's laptop, tablet, mobile phone, smart watch, and smart speaker).

Query module 224 may enable reminder component 220 to interact with state data access module 214 to obtain activity state data 126. In one example, query module 224 may obtain the activity state data in response to a newly generated reminder and before a notification time has been set. In another example, query module 224 may obtain the activity state data after a notification time has been set to enable the notification time to be adjusted. In the latter example, query module 224 may transmit a query (e.g., request) to obtain activity state data before, during, or after the notification time has arrived. For example, a reminder may be generated when an electronic message is received and may be associated with a future notification time (e.g., 24 hours later). When the notification time arrives, query module 224 may obtain the current activity state data so that it can be used to adjust the notification time using reminder updating module 225 (e.g., delay because the other user was just alerted).

Reminder updating module 225 may enable notification agent 124 to update an existing reminder to modify the notification time. This may be used to increase (e.g., delay) or decrease (e.g., expedite) the notification time of one or more reminders. In one example, reminder updating module 225 may detect, based on the activity state data, that an alert for the electronic message was presented to a second user on another device (e.g., message recipient on auxiliary device). In response, reminder updating module 225 may adjust the reminder for the first user to avoid reminding the first user to send a follow up message just prior to the second user sending the reply. By delaying the notification time of the reminder, notification agent 124 can avoid distracting the first user and avoid the consumption of computing resources associated with presenting the alert and preparing and transmitting the follow up message.

Data store 230 may be a memory (e.g., random access memory), a cache, a drive (e.g., a hard drive), a flash drive, a database system, or another type of component or device capable of storing data. Data store 230 may also include multiple storage components (e.g., multiple drives or multiple databases) that may also span multiple computing devices (e.g., multiple server computers).

Figure 3:
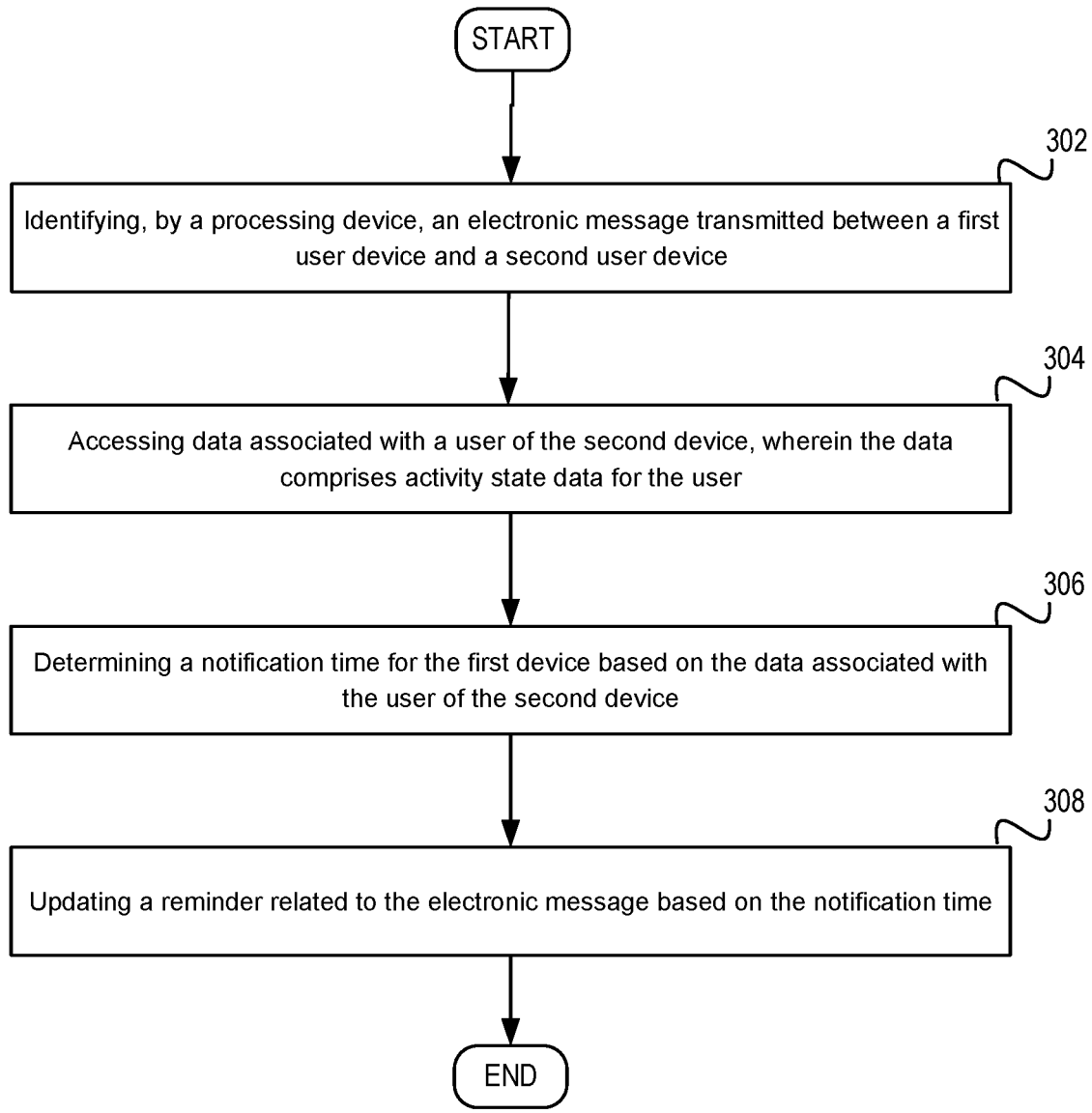
FIG. 3 is a flow diagram illustrating an example method in accordance with an implementation of the disclosure.

FIG. 3 depicts a flow diagram of one illustrative example of a method 300 for adaptively adjusting notifications to a first user based on activity of a second user, in accordance with one or more aspects of the present disclosure. Method 300 and each of its individual functions, routines, subroutines, or operations may be performed by one or more processors of the computer device executing the method. In certain implementations, method 300 may be performed by a single computing device. Alternatively, method 300 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by components 210 and 220 of FIG. 2.

Method 300 may be executed by processing devices of a client device or server device and may begin at block 302. At block 302, a processing device may identify an electronic message transmitted between a first user device and a second user device. The electronic message may include an email message, an instant message, a text message, a voice message, a video message, or a combination thereof. In one example, the electronic message may be sent by the first user device and may be associated with a reminder that corresponds to a follow-up message for the electronic message. In another example, the electronic message may be received by the first user device and the reminder may correspond to a response message (e.g., a reply) for the electronic message.

At block 304, the processing device may access data associated with a user of the second device. The data may include activity state data for the user and may include at least one of routine data, workload data, or alert data. In one example, the processing device may be a part of the first user device and accessing data associated with the user involves the first user device querying the second user device to obtain the activity state data (e.g., prior or future alerts corresponding to the electronic message). In another example, the processing device may be a part of a server of a message sharing platform and accessing the data associated with the user may involve querying user data from the server. In either example, the process of accessing data may be performed in response to a triggering of the reminder and may cause a reminder to be delayed before a notification is presented to the user of the first device.

At block 306, the processing device may determine a notification time for the first device based on the data associated with the user of the second device. In one example, this determination may involve detecting, based on the activity state data for the user of the second device, that a reminder alert for the electronic message was presented on the second device within a predefined time period.

At block 308, the processing device may update the reminder related to the electronic message based on the notification time. In one example, this may involve delaying the reminder on the first device based on the notification time. In another example, this may involve removing or expediting the reminder on the first device based on the notification time. Responsive to completing the operations described herein above with references to block 308, the method may terminate.

Figure 4:
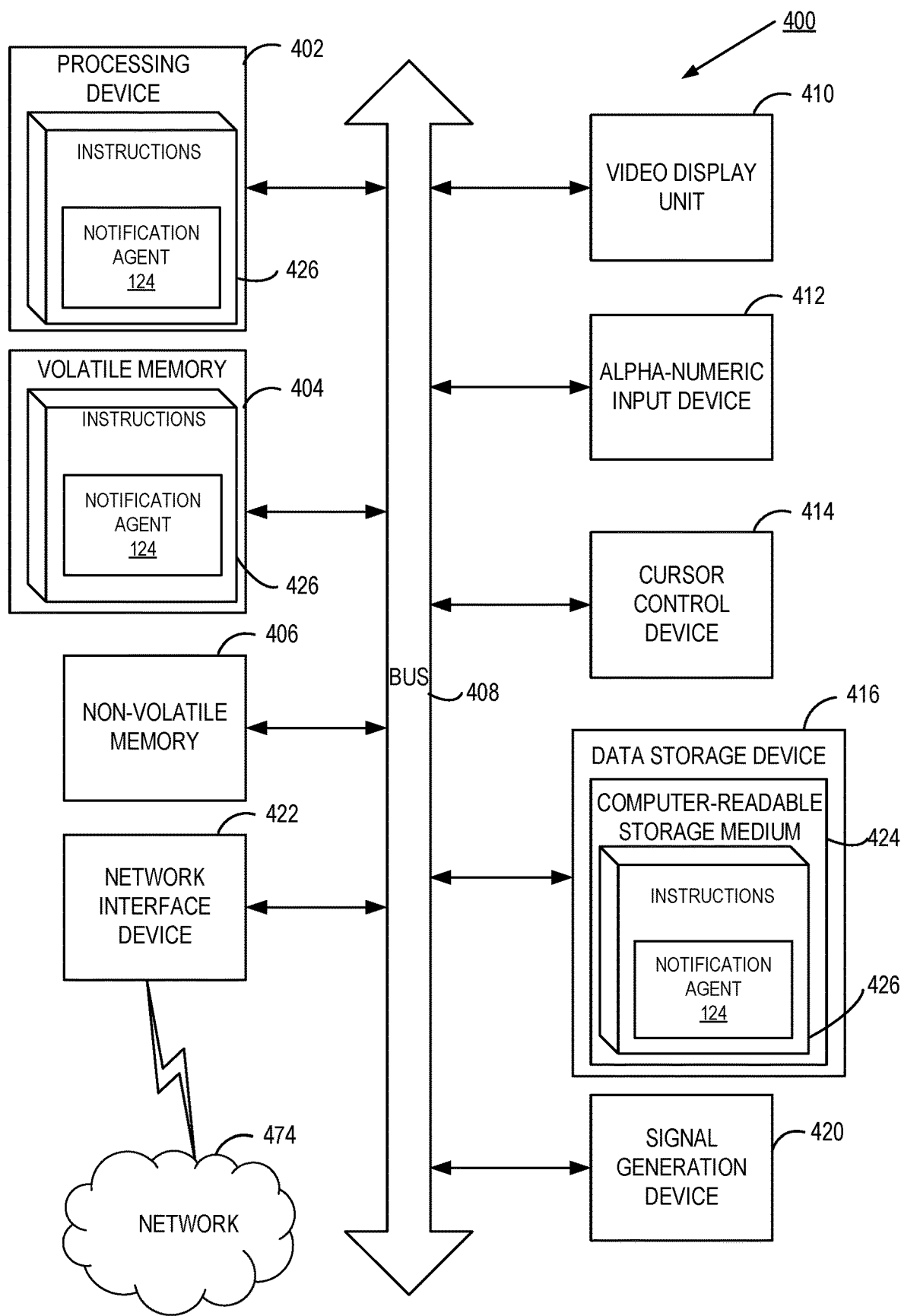
FIG. 4 is a block diagram illustrating another example of a computing device in accordance with an implementation of the disclosure.

FIG. 4 depicts a block diagram of a computer system operating in accordance with one or more aspects of the present disclosure. In various illustrative examples, computer system 400 may correspond to user devices 120A-Z of FIG. 1. The computer system may be included within a data center that supports virtualization. In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 may also include a video display unit 410 (e.g., an LCD), an alphanumeric input device 412 (e.g., a keyboard), a cursor control device 414 (e.g., a mouse), and a signal generation device 420.

Data storage device 416 may include a non-transitory computer-readable storage medium 424 on which may store instructions 426 encoding any one or more of the methods or functions described herein, including instructions for implementing method 300 and for electronic message component 210 or reminder component 220 of FIG. 2.

Instructions 426 may also reside, completely or partially, within volatile memory 404 and/or within the processing device 402 during execution thereof by computer system 400, hence, volatile memory 404, and processing device 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying, by a processing device, an electronic message transmitted between a first user device of a first user and a second user device of a second user;
   accessing, by the processing device, activity state data associated with the second user and the second user device, wherein the activity state data comprises alert data;
   detecting, based on the activity state data associated with the second user, that a reminder alert for the electronic message was presented on the second user device within a predefined time period;
   determining, by the processing device, a notification time for the first user based on the alert data associated with the second user; and
   updating, based on the notification time, a reminder related to the electronic message for the first user, wherein the updating delays a presentation of a reminder alert on the first user device.

2. The method of claim 1, wherein the electronic message comprises an email message, an instant message, a text message, a voice message, or a video message.

3. The method of claim 1, wherein the electronic message is sent by the first user device and the reminder corresponds to a follow-up message for the electronic message.

4. The method of claim 1, wherein the electronic message is received by the first user device and the reminder corresponds to a response message for the electronic message.

5. The method of claim 1, wherein the activity state data associated with the second user further comprises routine data and workload data.

6. The method of claim 1, wherein the processing device comprises a processing device of the first user device and wherein accessing the activity state data comprises transmitting a request for the activity state data to the second user device of the second user.

7. A system comprising:
   a memory; and
   a processing device communicably coupled to the memory, the processing device to:
      identify an electronic message transmitted between a first user device of a first user and a second user device of a second user;
      access activity state data associated with the second user and the second user device, wherein the activity state data comprises alert data;
      detect, based on the activity state data associated with the second user, that a reminder alert for the electronic message was presented on the second user device within a predefined time period;
determine a notification time for the first user based on the alert data associated with the second user; and
update, based on the notification time, a reminder related to the electronic message for the first user, wherein the updating delays a presentation of a reminder alert on the first user device.

8. The system of claim 7, wherein the electronic message comprises an email message, an instant message, a text message, a voice message, or a video message.

9. The system of claim 7, wherein the electronic message is sent by the first user device and the reminder corresponds to a follow-up for the electronic message.

10. The system of claim 7, wherein the electronic message is received by the first user device and the reminder corresponds to a response for the electronic message.

11. The system of claim 7, wherein the processing device comprises a processing device and wherein to access the data associated with the second user the processing device is to transmit a request for the activity state data to the second user device.

12. A non-transitory machine-readable storage medium comprising instructions that cause a processing device to:
identify an electronic message transmitted between a first user device of a first user and a second user device of a second user;
access activity state data associated with the second user and the second user device, wherein the activity state data comprises alert data;
detect, based on the activity state data associated with the second user, that a reminder alert for the electronic message was presented on the second user device within a predefined time period;
determine a notification time for the first user based on the alert data associated with the second user; and
update, based on the notification time, a reminder related to the electronic message for the first user, wherein the updating delays a presentation of a reminder alert on the first user device.

13. The non-transitory machine-readable storage medium of claim 12, wherein the electronic message comprises an email message, an instant message, a text message, a voice message, or a video message.

14. The non-transitory machine-readable storage medium of claim 12, wherein the electronic message is sent by the first user device and the reminder corresponds to a follow-up for the electronic message.

15. The non-transitory machine-readable storage medium of claim 12, wherein the electronic message is received by the first user device and the reminder corresponds to a response for the electronic message.

16. The non-transitory machine-readable storage medium of claim 12, wherein the activity state data associated with the second user further comprises routine data and workload data.

17. The non-transitory machine-readable storage medium of claim 12, wherein to access the activity state data, the processing device is to transmit a request for the activity state data to the second user device.

18. The method of claim 1, wherein the processing device comprises a processing device of a server and wherein accessing the data associated with the second user comprises querying user data from the server.

19. The system of claim 7, wherein the processing device comprises a processing device of a server and wherein accessing the data associated with the second user comprises querying user data from the server.

20. A method comprising:
identifying, by a processing device of a first user device, an electronic message transmitted between the first user device of a first user and a second user device of a second user;
transmitting, by the first user device, a request for activity state data associated with the second user;
receiving, by the first user device from the second user device, activity state data comprising alert data indicating an alert provided to the second user;
detecting, based on the activity state data associated with the second user, that a reminder alert for the electronic message was presented on the second user device of the second user within a predefined time period;
determining, by the processing device, a notification time for the first user based on the alert data associated with the second user; and
updating a reminder related to the electronic message for the first user based on the notification time, wherein the updating delays the reminder for the first user on the first user device.

* * * * *